(12) United States Patent
Kim et al.

(10) Patent No.: US 8,205,639 B2
(45) Date of Patent: Jun. 26, 2012

(54) VALVE SEALANT FITTING

(76) Inventors: Do A Kim, Daegu (KR); Seong Cheol Han, Daegu (KR); Dong Seok Chung, Daegu (KR)

(*) Notice: Subject to any disclaimer, the term of this patent is extended or adjusted under 35 U.S.C. 154(b) by 630 days.

(21) Appl. No.: 12/376,997

(22) PCT Filed: Aug. 10, 2007

(86) PCT No.: PCT/KR2007/003859
§ 371 (c)(1),
(2), (4) Date: Feb. 10, 2009

(87) PCT Pub. No.: WO2008/018777
PCT Pub. Date: Feb. 14, 2008

(65) Prior Publication Data
US 2010/0163775 A1 Jul. 1, 2010

(51) Int. Cl.
*E03B 1/00* (2006.01)
*F16K 1/30* (2006.01)
(52) U.S. Cl. .......... 137/614.2; 137/512; 184/105.2; 184/105.3
(58) Field of Classification Search ........ 137/614.2, 137/613, 512; 251/351; 184/105.1, 105.2, 184/105.3
See application file for complete search history.

(56) References Cited

U.S. PATENT DOCUMENTS

| | | | | | |
|---|---|---|---|---|---|
| 1,799,433 | A | * | 4/1931 | Murphy | 137/798 |
| 2,306,012 | A | * | 12/1942 | Campbell | 137/512 |
| 3,963,047 | A | * | 6/1976 | Moring | 137/596 |
| 4,347,915 | A | * | 9/1982 | Cooper | 184/105.3 |
| 4,354,523 | A | * | 10/1982 | Hochmuth et al. | 137/614.18 |
| 4,512,441 | A | | 4/1985 | Cooper | |
| 5,311,901 | A | | 5/1994 | Ostrom | |

FOREIGN PATENT DOCUMENTS
JP 60-139977 A 7/1985

* cited by examiner

*Primary Examiner* — John Fox
*Assistant Examiner* — Seth Faulb
(74) *Attorney, Agent, or Firm* — John K. Park; Park Law Firm

(57) ABSTRACT

Disclosed is a valve sealant fitting of high quality, which not only ensures rapid and easy injection of a sealant but also maximizes an effect of preventing a leakage. That is, the present invention provides a valve sealant fitting, which comprises, sequentially assembles and couples: a sealant body 10 having an insert coupling groove 12 with a sealing O-ring 12a mounted on an inner wall of the body, a sealant exit port 13 with a small diameter and a sloped injection port at a lower end of the body, and an exit port side ball 14 mounted at a bottom of the exit port 13; an insert 20 having an intermediate sealant movement path 21 for guiding the sealant to be injected toward an inner center of the insert and having a sealed port 22 and a coil spring 23 interposed at a lower end of the insert; and an upper end cap 30 having a sealant injection port 31 with a small diameter mounted on an upper end of the insert 20 and having an injection port side ball 32 mounted below the injection port 31.

2 Claims, 4 Drawing Sheets

[Fig. 1]
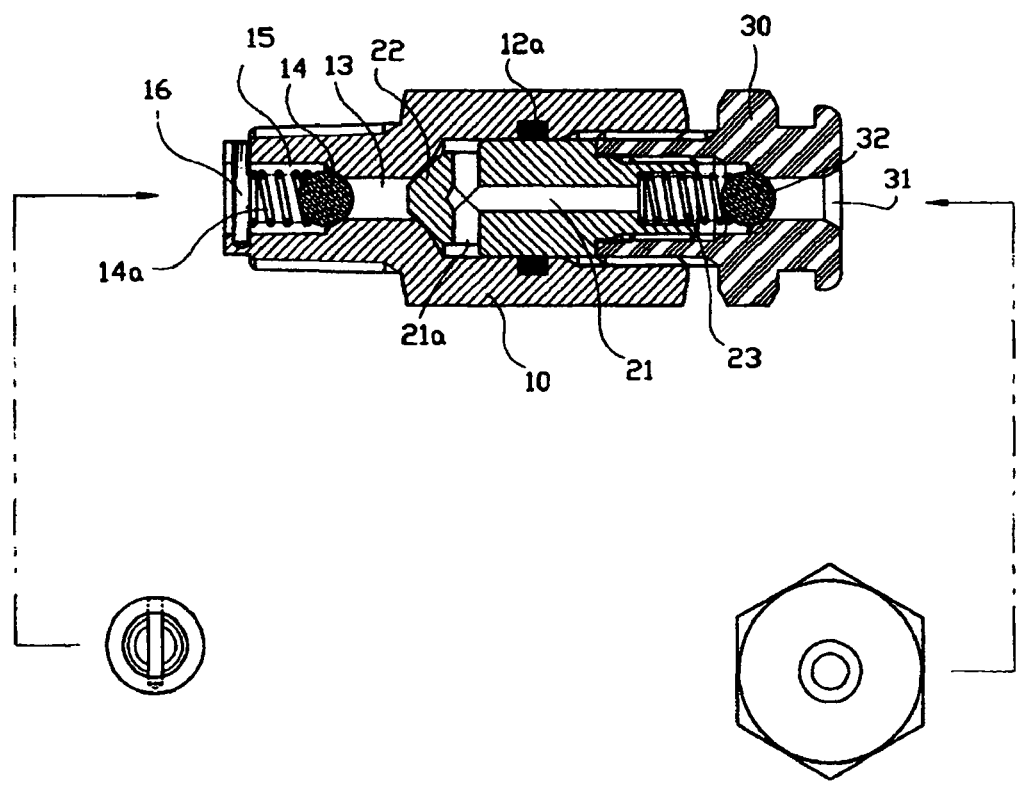

[Fig. 2]
(A)
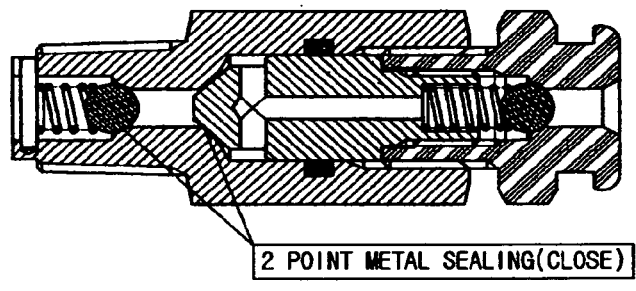
2 POINT METAL SEALING(CLOSE)
(B)
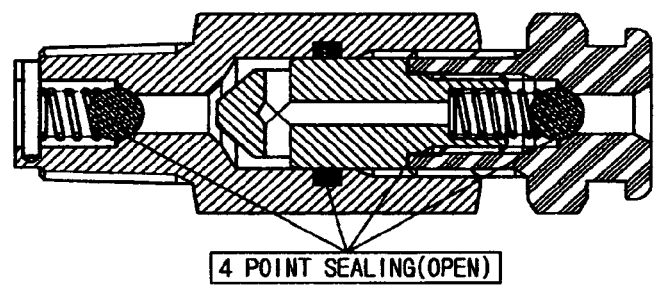
4 POINT SEALING(OPEN)
(C)
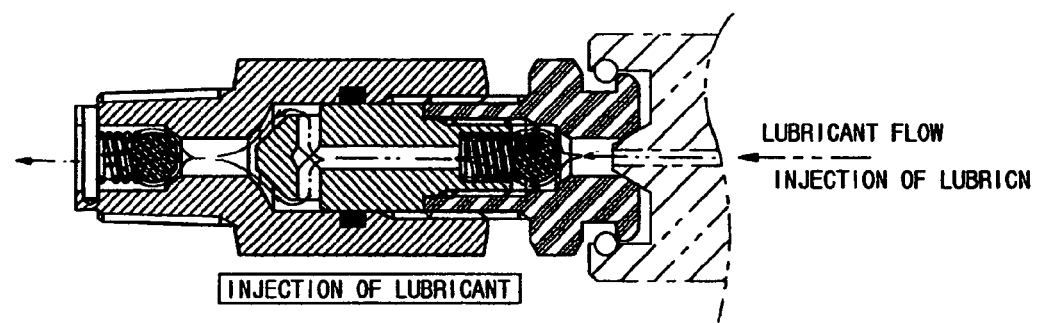
INJECTION OF LUBRICANT
LUBRICANT FLOW
INJECTION OF LUBRICN

[Fig. 3]
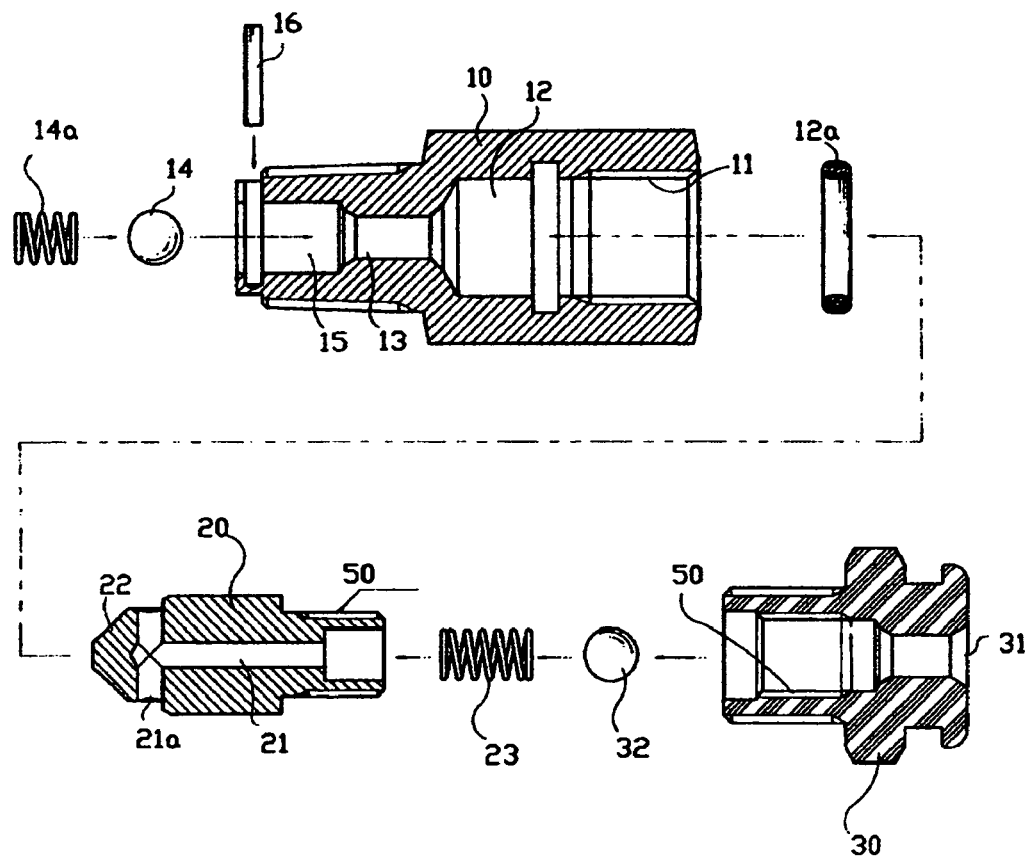

[Fig. 4] Prior Art
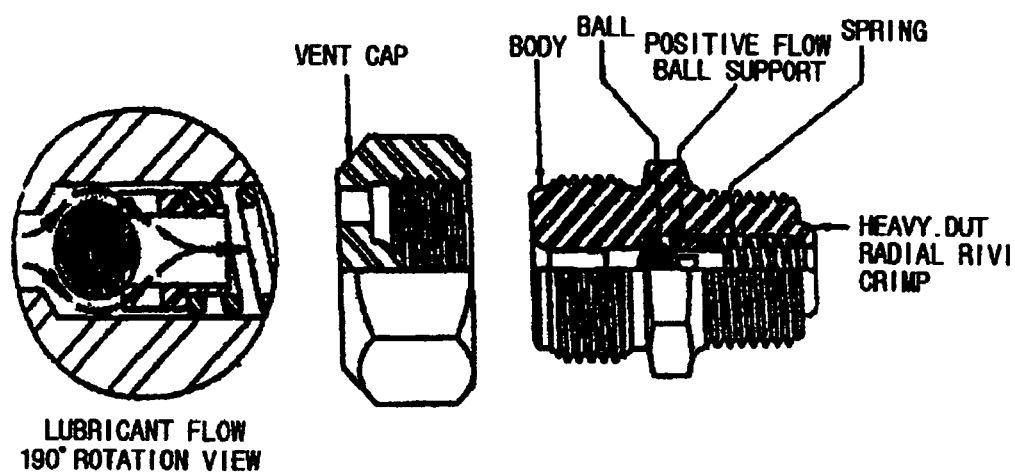

VALVE SEALANT FITTING

TECHNICAL FIELD

The present invention relates to sealant fittings of high quality, which not only ensures rapid and easy injection of a sealant but also maximizes an effect of preventing a leakage.

BACKGROUND ART

When a leakage typically occurs on a ball valve mounted in a pipe line for gas or fluid (petrochemical material or the like) due to abrasion or scratch of a sealing portion within the ball valve, three or four sealant fitting are mounted in one ball valve to allow not only a sealant for fluid interception to be rapidly injected but also a lubricant for keeping smooth operations and functions of the valve to be filled/injected if necessary.

However, according to the conventional sealant fitting nut as shown in FIG. 4, it is configured to allow the sealant to be injected by means of one ball closely attached to an injection port by a coil spring and to have a function of preventing a fluid back-flow in a sealant injection groove within a body of the fitting, and is also configured to have a vent cap thereabove which is coupled by means of nuts and must be removed/disjointed by unfastening screws (cap nuts) when the sealant needs to be injected, which is so burdensome that a rapid improvement is required.

In other words, the conventional sealant fitting having the sealant injection groove therein is configured to seal/intercept internal fluids of high pressure by means of one ball which blocks the injection port by means of a spring mounted at an inner lower portion of the injection groove as described above, so that there always exists a potentially high possibility of leaking fluids out of the valve when foreign materials are stuck in or scratches occur on the ball.

In addition, the sealant for internal fluid interception can be injected only after the vent cap mounted on the upper portion of the fitting is completely unfastened and removed when the sealant needs to be injected due to an emergency, which thus significantly degrades a rapid control resulting from the emergency.

In addition, the conventional sealant fitting is additionally assembled with the vent cap having a large outer diameter and mounted on the upper portion of the fitting by means of screws as described above, so that a significantly large space for mounting the same is disadvantageously required.

DISCLOSURE OF INVENTION

Technical Problem

The present invention is directed to a sealant fitting, which allows a sufficient amount of sealant to be injected even when a cap mounted on the fitting is unfastened by at least one pitch without completely removing the cap from the fitting when the sealant needs to be injected, mounts a ball for preventing an injected fluid from flowing back not only on a sealant injection port but also on an exit port of a lower end of the fitting so that double sealing can be accomplished by means of the balls, and further secures an O-ring for internal sealing of a sealant injection groove and a metal sealing so that a completely fourfold sealant structure including the double balls as described above can be provided.

Technical Solution

One aspect of the present invention is to provide a valve sealant fitting, which comprises, sequentially assembles and couples: a sealant body 10 having an insert coupling groove 12 with a sealing O-ring 12a disposed on an inner wall of the body, a sealant exit port 13 with a small diameter and a sloped inlet port at a lower end of the body, and an exit port side ball 14 mounted at a bottom of the exit port 13; an insert 20 having an intermediate sealant flow path 21 for guiding the sealant to be injected toward an inner center of the insert and having a sealed port 22 and a coil spring 23 interposed at a lower end of the insert; and an upper end cap 30 having a sealant injection port 31 with a small diameter mounted on an upper end of the insert 20 and having an injection port side ball 32 mounted below the injection port 31.

Advantageous Effects

According to a valve sealant fitting of the present invention as described above, a sufficient amount of sealants can be injected even when a structure integrally formed with an insert and a cap is unfastened/rotated by a half rotation or up to one rotation when a sealant is injected into the valve, so that the sealant can be rapidly and easily injected, a fourfold sealing ability can be guaranteed by means of an injection port side ball, a sealing O-ring, a sealed port and an exit port side ball, complete metal sealing can be obtained, a function of preventing the sealant from being leaked can be obtained, a function of remarkably preventing a fluid from being flowing back and leaked can be obtained, and the fitting can be easily installed even in a small space.

BRIEF DESCRIPTION OF THE DRAWINGS

FIG. 1 is a structural view illustrating a valve sealant fitting according to a preferred embodiment of the present invention.

FIG. 2A to 2C are views sequentially illustrating operational states of the present invention.

FIG. 3 is a disassembled view of a sealant fitting according to the present invention.

FIG. 4 is a structural view of a conventional sealant fitting.

BEST MODE FOR CARRYING OUT THE INVENTION

The present invention provides a valve sealant fitting, which comprises:

a sealant body 10 having a screw groove 11 for assembling an upper cap at its upper end, an insert coupling groove 12 with a sealing O-ring 12a disposed on an inner wall of the insert coupling groove, a sealant exit port 13 with a small diameter and a sloped inlet port at a lower end of the coupling groove 12, and an exit port side ball 14 acting to open a bottom end of the exit port 13 when the internal fluid flows back and acting to block the bottom end of the exit port 13 when the sealant is injected;

an insert 20 having an intermediate sealant flow path 21 for guiding the sealant to be injected toward an inner center of the insert in an inner insert coupling groove 12 of the body 10, a tapered and protruded sealed port 22 for an exit port capable of sealing the sealant exit port 13 at an upper end of the sealed port 22, outlet ports 21a disposed at both upper ends of the sealed port 22 toward an inner wall surface of the body for stopping the sealant flow when the exit port 13 is completely blocked and allowing the sealant to immediately flow when a fine opening occurs, and a coil spring 23 interposed at a lower end of the insert, and an insert 20 interposed at an upper end of the insert; and an upper cap 30 having a sealant injection port 31 with a small diameter at an upper end of the insert 20, and an upper injection port side ball 32 disposed below the ball and allowing the cap to be elastically opened by the spring when the sealant is injected and allowing cap to be closely sealed by the spring 23 in a normal state, wherein the sealant body 10, the insert 20, and the upper cap 30 are sequentially assembled and coupled together.

MODE FOR THE INVENTION

The present invention will be described in detail with reference to accompanying drawings as follows.

In consideration of the sealant fitting as shown in FIG. 1, the present invention provides a valve sealant fitting, which comprises, sequentially assembles and couples:

a sealant body 10 having a screw groove 11 for assembling an upper cap at its upper end, an insert coupling groove 12 with a sealing O-ring 12*a* mounted on an inner wall of the insert coupling groove, a sealant exit port 13 with a small diameter and a sloped inlet port at a lower end of the coupling groove 12, and an exit port side ball 14 acting to open a bottom end of the exit port 13 when the internal fluid flows back and acting to block the bottom end of the exit port 13 when the sealant is injected;

an insert 20 having an intermediate sealant flow path 21 for guiding the sealant to be injected toward an inner center of the insert in an inner insert coupling groove 12 of the body 10, a tapered and protruded sealed port 22 for an exit port capable of sealing the sealant exit port 13 at an upper end of the sealed port 22, outlet ports 21*a* disposed at both upper ends of the sealed port 22 toward an inner wall surface of the body for stopping the sealant flow when the exit port 13 is completely blocked and allowing the sealant to immediately flow when a fine opening occurs, and a coil spring 23 interposed at a lower end of the insert, and an insert 20 interposed at an upper end of the insert; and an upper cap 30 having a sealant injection port 31 with a small diameter at an upper end of the insert 20, and an upper injection port side ball 32 disposed below the ball and allowing the cap to be elastically opened by the spring when the sealant is injected and allowing cap to be closely sealed by the spring 23 in a normal state, wherein the sealant body 10, the insert 20, and the upper cap 30 are sequentially assembled and coupled together.

The present invention is also characterized in that a screw assembling portion 50 for the upper cap 30 and the insert 20 has a left-handed screw coupling structure in order that a complete metal sealing be additionally secured in a coupling portion 40 where the upper cap 30 and the insert 20 are assembled by means of screws so that the insert and the upper cap 30 are not unfastened and removed even when the upper cap 30 is unfastened by at least one pitch.

In addition, a sealing angle and an outer diameter of the insert 20 can be minimized to increase a volume of the insert so that the fitting can have a structure allowing a sealant to be rapidly injected, and the O-ring 12*a* for inner sealing can guide the insert 20 when the insert 20 and the body 10 are sealed by metal so that a secure sealing property can be obtained.

In addition, the exit port side ball 14 disposed at a lower end of the exit port 13 is located within the groove 15 with a larger diameter than that of the ball for safely receiving the exit port side ball so that the ball has a function of originally blocking the back-flow of the fluid by being closely attached to/blocking the bottom of the exit port 13 with a sloped angle when the fluid flows back, and a coil spring 14*a* and a stopper pin 16 for elastic action and preventing downward deviation of the exit port side ball 14 are located below the exit port side ball.

Therefore, according to the sealant fitting of the present invention configured as described above and shown in FIG. 1 to FIG. 2A, a primary function of preventing a fluid from flowing back can be obtained by the exit port side ball disposed at the lowest end of the body, a secondary function of metal sealing can be obtained by the tapered and sealed port for an exit port disposed at a lower end of the insert, a tertiary sealing function can be obtained by the sealing O-ring interposed between the wall surface of the insert coupling groove within the body and the outer wall surface of the insert inserted into the groove, and a quaternary sealing function can be obtained by the elastic force of the coil spring disposed at the sealant injection port side of the upper cap, so that a complete and remarkable sealing can be secured by the fourfold structure of preventing the back flow compared to the prior art.

When the upper cap is rotated to be unfastened by about one rotation for allowing the sealant to be injected as shown in FIG. 2C, the sealed port at the lower end of the insert coupled to the cap is raised to cause the exit port to be opened, so that the sealant can be rapidly and easily injected. That is, when the sealant is injected through the injection port disposed at the upper end after the sealed port is opened by rotating the cap by one rotation, the injection port side ball closely attached to the spring within the upper cap is opened downward to a predetermined degree by the injection pressure, so that the sealant can be easily injected through the intermediate flow path of the insert, the opened exit port, and the groove for safely receiving the exit port side ball.

In this case, the screw assembling portion for the upper cap and the insert may be unfastened together with an unfastening rotation of the upper cap, however, the screw assembling portion has a left-handed screw structure for coupling, which is opposite to the right-handed screw assembling between the upper cap and the body, so that a more fastened structure can be obtained, which thus allows an additional metal sealing to be secured, allows the upper cap and the insert which are completely and integrally formed to operate as one body, and facilitates manipulation thereof.

Consequently, the sealant fitting of the present invention has a structure where the cap and the insert are integrally formed with the body, so that the sealant can be immediately injected so long as the integrated structure is unfastened about one rotation when the sealant is injected. Accordingly, injection of the sealant can be significantly facilitated, not only complete and remarkable sealing but also additional metal sealing can be secured by means of the fourfold sealing structure as described above after the sealant is completely injected, and in particular, the sealant can be completely prevented from being leaked even when it is being injected, which thus remarkably differentiates the present invention from the prior art.

Further, according to the sealant fitting of the present invention, components such as additional nuts which have been required at an outer side of the body in the prior art are not assembled, so that the fitting with a relatively smaller outer diameter can be manufactured and can be mounted in a smaller space for the valve.

The invention claimed is:

1. A valve sealant fitting comprising:
  a sealant body (10) having a screw groove (11) for assembling an upper cap (30) at its upper end, an insert coupling groove (12) with a sealing O-ring (12*a*) mounted on an inner wall of the insert coupling groove, a sealant exit port (13) with a small diameter and a sloped inlet port at a lower end of the coupling groove (12), and an exit port side ball (14) acting to close a bottom end of the exit port (13) when the internal fluid back flows and acting to open the bottom end of the exit port (13) when the sealant is injected;

an insert (20) having an intermediate sealant flow path (21) for guiding the sealant to be injected toward an inner center of the insert in an inner insert coupling groove (12) of the body (10), a tapered and protruded sealed port (22) for an exit port capable of sealing the sealant exit port (13) at an upper end of the sealed port (22), outlet ports (21*a*) disposed at both upper ends of the sealed port (22) toward an inner wall surface of the body for stopping the sealant flow when the exit port (13) is completely blocked and allowing the sealant to immediately flow when a fine opening occurs, and a coil spring (23) interposed at an upper end of the insert; and the upper cap (30) having a sealant injection port (31) with a small diameter at an upper end of the insert (20), and an upper injection port side ball (32) disposed below the ball and allowing the cap to be elastically opened by the spring when the sealant is injected and allowing cap to be closely sealed by the spring (23) in a normal state, wherein the sealant body (10), the insert (20), and the upper cap (30) are sequentially assembled and coupled together, wherein a screw assembling portion (50) for the upper cap (30) and the insert (20) has a left-handed screw coupling structure in order that a complete metal sealing be additionally secured in a coupling portion (40) where the upper cap (30) and the insert (20) are assembled by means of screws so that the insert and the upper cap (30) are not unfastened and removed even when the upper cap (30) is unfastened by at least one pitch.

2. The valve sealant fitting according to claim 1, wherein the exit port side ball (14) disposed at a lower end of the exit port (13) is located within the groove (15) with a larger diameter than that of the ball for safely receiving the exit port side ball so that the ball has a function of originally blocking the back-flow of the fluid by being closely attached to/blocking the bottom of the exit port (13) with a sloped angle when the fluid flows back, and a coil spring (14*a*) and a stopper pin (16) for elastic action and preventing downward deviation of the exit port side ball (14) are located below the exit port side ball.

\* \* \* \* \*